United States Patent [19]

Lin et al.

[11] Patent Number: 5,097,070

[45] Date of Patent: Mar. 17, 1992

[54] HIGH MOLECULAR WEIGHT TRIFUNCTIONAL POLYOXYETHYLENE AMINES

[75] Inventors: Jiang-Jen Lin, Houston; George P. Speranza, Austin, both of Tex.

[73] Assignee: Texaco Chemical Company, White Plains, N.Y.

[21] Appl. No.: 431,056

[22] Filed: Nov. 3, 1989

[51] Int. Cl.$^5$ .............................................. C07C 237/22
[52] U.S. Cl. .................................. 564/153; 528/335; 528/340
[58] Field of Search ................. 564/153; 528/335, 340

[56] References Cited

U.S. PATENT DOCUMENTS 3,326,853  6/1967  Earhart et al. ...................... 564/153
4,795,581  1/1989  Nieh et al. ............................ 528/332

*Primary Examiner*—Richard L. Raymond
*Assistant Examiner*—P. O'Sullivan
*Attorney, Agent, or Firm*—Jack H. Park; Kenneth R. Priem; Cynthia L. Kendrick

[57] ABSTRACT

High molecular weight secondary amine terminated amides are disclosed which are prepared by a two-step process wherein a triamine and dibasic acid are reacted to form an acid terminated amide intermediate which is further reacted with a polyethylene glycol diamine or N,N'-diisopropyl derivative thereof to form an ungelled amine terminated product which is useful as an epoxy curing agent.

The product can be represented by the following structure:

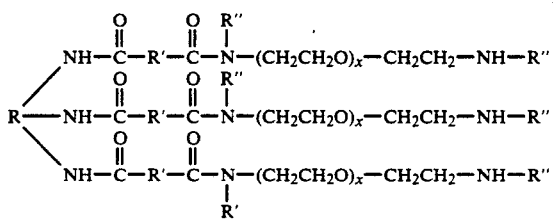

where $x = 1$ to 5 and $R'' = H$ or $C_1$ to $C_4$ carbon atoms.

14 Claims, No Drawings

HIGH MOLECULAR WEIGHT TRIFUNCTIONAL POLYOXYETHYLENE AMINES

FIELD OF THE INVENTION

This invention relates to the preparation of novel polyoxyethylene amines. More particularly this invention relates to a series of new high molecular weight amine terminated amides prepared in a two-step process from an intermediate acid terminated amide resulting from the reaction of a polyoxyalkylene triamine and a dibasic acid reacted with a polyethylene glycol diamine. In an alternative embodiment the intermediate amide is reacted with an N,N'-diisopropyl derivative of an ethylene glycol diamine. The novel compositions comprise secondary amine-amides, amido amines or amido-secondary amines. The amides are ungelled and exhibit usefulness as epoxy curing agents.

BACKGROUND OF THE INVENTION

Those skilled in the art are continually looking for new compositions which do not exhibit gelling to use as curatives in epoxy resin applications. Also, compositions which can be prepared under mild conditions from commonly available reactants are extremely desirable. If such compositions predictably add certain desirable properties to the cured product, there will be a substantial demand for these compositions.

It is known in the art to react polyoxyalkylene amines with various compounds to produce epoxy curing agents, but it appears to be previously undisclosed in the art to react an acid terminated amide intermediate with a polyethylene glycol diamine or with a secondary isopropyl derivative of a polyethylene glycol diamine.

The preparation of the secondary isopropyl amine derivative used as a reactant in one embodiment of this invention is described in copending U.S. patent application Ser. Nos. 07/322,020, 07/322,021 and 07/264,643. These applications disclose methods for preparing secondary isopropyl amine derivatives of polyoxyethylene and/or polyoxypropylene primary diamines or triamines with acetone in the presence of a hydrogenation catalyst and hydrogen.

It would be useful in the art to prepare a variety of ungelled compositions useful as epoxy curing agents which could be designed with properties tailored to certain requirements. In addition it would be desirable if a new series of high molecular weight amine terminated amides with the above-identified properties could be prepared by means of a simple coupling reaction.

SUMMARY OF THE INVENTION

It is an object of the present invention to provide a method of preparing novel tailored secondary amine terminated amides which are ungelled and are tailored for a variety of uses as epoxy curing agents, especially in applications as RIM chain extenders.

More specifically, in accordance with the present invention, there is provided a process for the preparation of high molecular weight amine terminated amides which are viscous liquids or semisolids. The amines comprise the reaction product of an acid terminated amide intermediate with a polyoxyethylene diamine or a secondary isopropyl derivative of a polyoxyethylene diamine at a temperature of 150° C.-300° C. and atmospheric pressure.

DESCRIPTION OF THE PREFERRED EMBODIMENT

According to the present invention novel trifunctional amine terminated amides are prepared in a two-step process. These novel products, formed by a simple coupling reaction of amide linkages, are of high molecular weight and have a unique structure, each possessing three terminated amines and several amide linkages.

The reactants include a polyoxyalkylene triamine, a dimer acid and a polyoxyalkylene diamine or a secondary isopropyl derivative of a polyoxyalkylene diamine.

In the first step the polyoxyalkylene triamine is reacted with a molar excess of dimer acid to form an intermediate acid terminated amide. The intermediate acid terminated amide is then reacted with a diamine or an isopropyl derivative of a polyoxyalkylene diamine. The two-step process can generally be represented by the following:

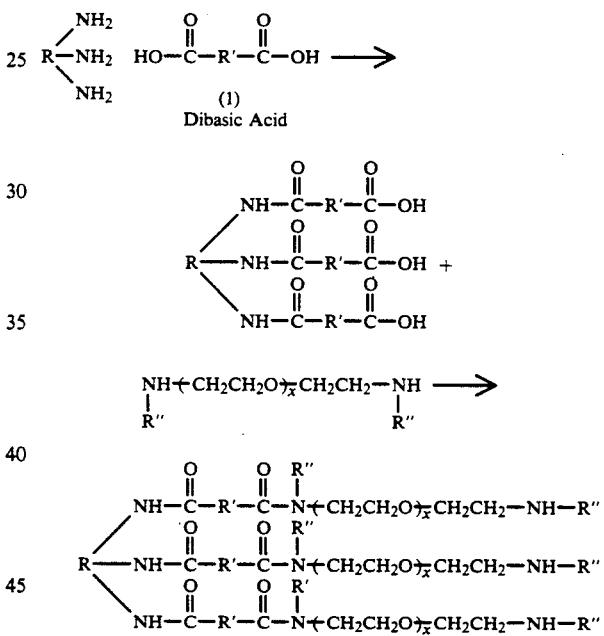

where $x=1$ to 5 and $R''=H$ or $C_1$ to $C_4$ carbon atoms.

The polyoxyethylene polyamines used as the starting material in the instant invention have the following general formula:

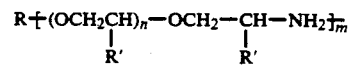

wherein R is the nucleus of an oxyalkylation-susceptible polyhydric alcohol containing 2 to 12 carbon atoms and 2 or 3 hydroxyl groups, R' is hydrogen or methyl, n is a number having an average value of 0 to 100, and m is an integer having a value of 2 to 3.

The group of polyoxyalkylene polyamines which provide the best results in the instant invention are polyoxyalkylene triamines. The polyoxyalkylene triamines useful herein can be represented by the following formula:

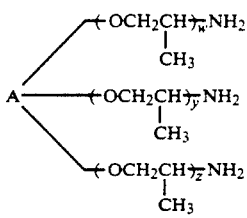

wherein A represents the nucleus of an oxyalkylation susceptible trihydric alcohol containing about 3 to about 6 carbon atoms, w, y and z are numbers and the average value of the sum of w+y+z is from about 4 to about 100.

An example of appropriate polyoxypropylene triamines which may be used as the starting materials for the present invention include triamines sold by Texaco Chemical Co. as JEFFAMINE ® T-series products having the above formula. An example of such a product having an average molecular weight of about 400 wherein A represents a trimethylol propane nucleus and containing about 5 to about 6 moles of propylene oxide, is JEFFAMINE ® T-403 amine. Another triamine product having an average molecular weight of 3000 wherein A represents a glycerol nucleus and the product contains about 50 moles of propylene oxide is JEFFAMINE ® T-3000 amine; and a product having an average molecular weight of about 5000 wherein A represents a glycerol nucleus and the product contains about 85 moles of propylene oxide is JEFFAMINE ®-5000 amine.

The dicarboxylic acids useful in the instant invention are preferably those having a high number of carbons and exhibiting flexibility. Although adipic acid was useful, better results were obtained using a high molecular weight dibasic acid preferably containing 36 carbons, such as dimer acid.

The polyoxyalkylene diamines which may be used alone or as the source of the disecondary isopropyl amine derivative which is reacted with the intermediate product of the triamine and dimer acid include those sold by Texaco Chemical Co. as JEFFAMINE ® EDR-series products having the formula:

$$H_2N-CH_2-CH_2[-O-CH_2-CH_2]_x-NH_2$$

wherein x is 2 or 3. Representative products having this structural formula include polyoxyethylene diamines having the structure above where:
x=2 for JEFFAMINE ® EDR-148
x=3 for JEFFAMINE ® EDR-192

JEFFAMINE ® EDR-148 is a tradename for triethylene glycol diamine and JEFFAMINE ® EDR-192 is the tradename for tetraethylene glycol diamine.

The polyoxyalkylene diamines are alkylated according to the procedures in patent application Ser. Nos. 07/322,020, 07/322,021 and 07/264,643 to produce the N-isopropyl diamine derivatives used in the Examples of this invention.

In that procedure the polyoxyalkylene diamine is reacted with acetone in the presence of a hydrogenation catalyst and hydrogen wherein the ratio of acetone to amine starting material is within the range of about 1.5 to about 3 mole equivalents of acetone per mole of primary amine group present in the amine reactant.

As stated, the novel high molecular weight ungelled amides are prepared in two steps. In the first step the polyoxyalkylene triamine and dibasic acid are charged to a three necked flask equipped with a thermometer, Dean-Stark trap, mechanical stirrer and nitrogen inlet and the mixture is heated to a temperature in the range of 150° C. to 300° C. and preferably about 80° C. to 240° C. for a period of from 3 to 8 hours.

Preferably the dibasic acid is in excess. A molar ratio of triamine to dimer acid, for example, of 1:3 to 1:6 can be used. Good results were obtained using a molar ratio of triamine to dimer acid of about 1:3.

Any water which was generated was removed. The acid terminated amide intermediate to be used in the second step is generally a transparent, light colored, viscous liquid which can be represented by the formula:

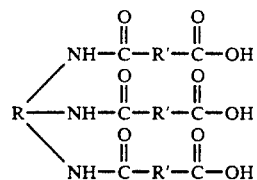

In the second step the triamine dimer acid adduct is reacted with a polyoxyethylene diamine or a secondary isopropyl derivative of a polyoxyethylene diamine. Here the dimer acid adduct and the diamine or diamine derivative are charged to a three-necked flask and heated to 200° C. to 250° C. for 1 to 24 hours.

The product can be represented by the following:

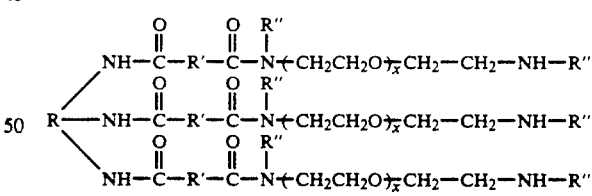

where x is 1 to 5 and, R' is $C_4$ to $C_{34}$ carbon atoms and R" is H or $C_1$ to $C_4$ carbon atoms.

The novel high molecular weight secondary amine terminated amides are ungelled and contain three terminated amines and several amide linkages. Generally the products are viscous liquids or semi-solids.

The present invention will be further illustrated by the following Examples which are only for the purpose of illustration and ar not to be regarded as limiting the invention in any way.

Table I and Examples I and II demonstrate the addition of a polyoxyethylene diamine to the acid terminated intermediate.

TABLE I

Synthesis of Trifunctional, High Molecular Weight, Active Amines With Amide Linkages

| Examples | 1st JEFF-AMINE ® Amine (1 mole equiv.) | Dicarboxylic Acid (3 mole equiv.) | 2nd JEFF-AMINE ® Amine (3 mole equiv.) | Products, meq/g NH$_2$ | COOH |
| --- | --- | --- | --- | --- | --- |
| 1 | T-5000 | C$_{36}$ Dimer acid | EDR-148 (3.3 mole eq.) | 0.44 | 0.01 |
| 3 | T-3000 | Adipic acid | EDR-148 | 0.56 | 0.03 |
| 4 | T-3000 | C$_{36}$ Dimer acid | EDR-148 | 0.43 | 0.03 |
| 5 | T-3000 | " | EDR-192 | 0.36 | 0.05 |
| 6 | T-5000 | " | EDR-148 | 0.23 | 0.03 |
| 7 | T-5000 | " | EDR-192 | 0.31 | 0.02 |

EXAMPLE 1

T-5000/Dimer Acid/EDR-148 (1:3:3) Adduct

A 500 ml three-necked flask equipped with a thermometer, Dean-Stark trap and nitrogen inlet line, was charged with a 1:3 molar ratio adduct of T-5000/dimer acid 1:3 (153 g, 0.025 moles, Example 1) and EDR-148 (12.2 g, 0.0825 moles). The mixture was heated to 190°–230° C. for ≈6 hours to remove water. The product was a light brown semi-solid with analysis of 0.44 meq/g (calc. 0.5 meq/g) for amine and an acidity of 0.014 meq/g. The low acidity indicated the completion of the reaction.

EXAMPLE 2

T-5000/Dimer Acid/EDR-192 (1:3:3) Adduct

The experimental procedures of Example 1 were repeated except using EDR-192 (20g, 94% purity, 0.098 mole) instead of EDR-148. The product was a light yellow transparent liquid. This is the only product existing in liquid form among the products made from T-3000, T-5000, adipic acid, dimer acid, EDR-148 and EDR-192 (see other examples).

EXAMPLE 8

Preparation of Acid-Terminated Amide From JEFFAMINE ® T-3000 And Dimer Acid (1:3 molar ratio)

A 2-liter three-necked flask equipped with a thermometer, Dean-Stark trap, mechanical stirrer and nitrogen inlet line was charged with JEFFAMINE ® T-3000 (750 g, 0.25M) and C$_{36}$ dimer acid (Emery Empoly 1010, 420 g, 0.71M). The mixture was heated to 180°≈220° C. for over 5 hours. The water generated was removed through a Dean-Stark trap. The resulting product mixture (1153 g) was transparent, light-colored, viscous liquid. The analyses of the product showed an acidity of 0.69 meq/g (calc. 0.65 meq/g) and an amine content of <0.01 meq/g.

EXAMPLE 9

Preparation Of Secondary Amine-Terminated Amide From T-3000 Dimer Acid Adduct And Diisopropyl EDR-192

A 500 ml three-necked flask equipped with a thermometer, Dean-Stark trap, stirrer and nitrogen inlet line was charged with JEFFAMINE ® T-3000 dimer acid adduct (Examples, 102 g, 0.023 mole) and N,N'-diisopropyl tetraethylene glycol diamine (N,N'-diisopropyl JEFFAMINE ® EDR-192, 22.9 g, 0.083 mole). The mixture was heated to 220°–240° C. for 6 hours to remove generated water. The resulting product was a viscous, yellow liquid. The analysis indicated total amine 0.92 meq/g, acidity 0.02 meq/g and viscosity 22,000 cs/20° C.

EXAMPLE 10

Usage Example

The sample of Example 9 (40 g) and EPON ® 828 (Shell product, 6.9 g) were mixed well and poured into a mold and cured at 100° C. for overnight. The resulting product was a very tough, rubbery polymer.

EXAMPLE 11

Preparation Of Acid-Terminated Amide From JEFFAMINE ® T-403 And Dimer Acid (1:3 molar ratio)

A 2-liter three-necked flask equipped with a thermometer, Dean-Stark trap, stirrer and N$_2$ line was charged with JEFFAMINE ® T-403 (230 g, 0.5M) and dimer acid (840 g, 1.5M). The mixture was heated to 180°≈220° C. for over 6 hours to remove generated water. The resulting product had an analyses of acidity of 1.34 meq/g (calc. 1.42 meq/g) and a total amine content of 0.03 meq/g. It was a light-colored, transparent semi-solid.

EXAMPLE 12 (6300-46)

Preparation Of Secondary Amine-Terminated Amide From T-403-Dimer Acid Adduct and Diisopropyl EDR-192

A 250 ml three-necked flask equipped with a thermometer, Dean-Stark trap, stirrer and N$_2$ line was charged with the adduct of T-403-dimer acid (Example 11, 100 g, 0.045M) and N,N'-diisopropyl tetraethylene glycol diamine (37 g, 0.133M). The mixture was heated to 240° C. for 4 hours to remove generated water. The resulting product had an analyses of 1.18 meq/g for total amine, 0.25 meq/g for acidity and 46,000 cs/50° C. for viscosity.

EXAMPLE 13 (6300-46-1)

Usage Example

The sample of Example 12, (20 g) and EPON ® 828 (4.4 g) were mixed well and poured into a mold and cured at 100° C. overnight. The resulting material was a very tough rubbery polymer which was less flexible than polymer product of Example 10.

The physical properties of the secondary amine terminated amide products are summarized in the attached table.

The products represented in Table II were prepared using the isopropyl derivatives of ethylene diamines in a two-step process which can be represented by the following equation:

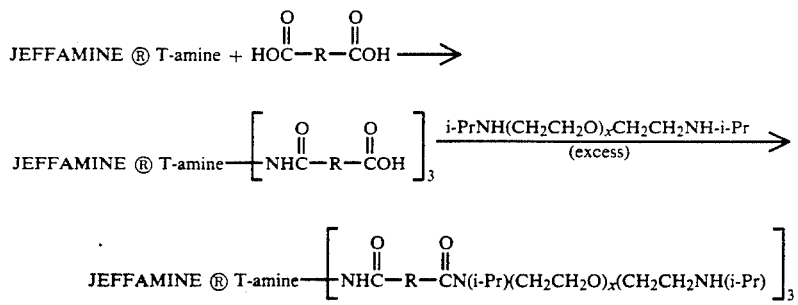

where x=2 or 3.

TABLE II
Secondary Amine Terminated Amide From
JEFFAMINE ® Amine And C-36 Dicarboxylic Acid Coupling

| Starting Materials | | Product Properties |
|---|---|---|
| T-403 | i-Pr$_2$ EDR-148 | yellow viscous liquid<br>viscosity 59,000 cs/50° C.<br>amine 1.24 meq/g<br>acidity 0.59 meq/g |
| | i-Pr$_2$EDR-192 | yellow viscous liquid<br>viscosity 46,000 cs/50° C.<br>amine 1.18 meq/g<br>acidity 0.25 meq/g |
| T-3000 | i-Pr$_2$ EDR-148 | semisolid-liquid<br>viscosity 102,000 cs/50° C.<br>amine 0.66 meq/g<br>acidity 0.23 meq/g |
| | i-Pr$_2$ EDR-192 | yellow viscous liquid<br>viscosity 22,000 cs/50° C.<br>amine 0.92 meq/g<br>acidity 0.02 meq/g |

Two-Step Reaction: (A) JEFFAMINE ® T-amine and dimer acid to form a carboxylic acid terminating amides and ® subsequent reactions with diisopropyl JEFFAMINE ® EDR-amine to produce amine terminated products.

What is claimed is:

1. A high molecular weight amine terminated amide comprising the reaction product of
   a polyoxypropylene triamine-aliphatic dicarboxylic acid adduct represented by the structure:

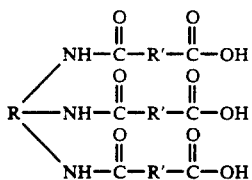

where R represents an oxyalkylated trihydric C$_3$-C$_{12}$ alcohol, R' contains 4 to 34 carbon atoms, said adduct resulting from the reaction of a polyoxypropylene triamine having a molecular weight of from about 400 to 5000 and about 1 mole per amine group in the triamine of an aliphatic dicarboxylic acid containing 6 to 36 carbon atoms, further reacted with
   a polyoxyethylene diamine or an N,N'-dialkyl derivative thereof wherein the alkyl group contains from 1 to 4 carbon atoms and wherein said adduct is reacted with a diamine of the formula:

H$_2$N—CH$_2$—CH$_2$[—O—CH$_2$—CH$_2$]$_x$—NH$_2$ where x=2 or 3 in a molar ratio of diamine to adduct of about one mole diamine per carboxyl group in the adduct.

2. The amine terminated amide of claim 1 wherein the polyoxypropylene triamine-aliphatic dicarboxylic acid adduct is the reaction product of a polyoxypropylene triamine of the formula:

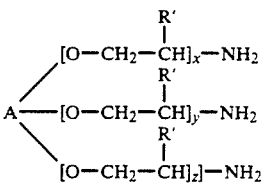

wherein:
R' represents methyl,
A represents the nucleus of an oxyalkylation susceptible trihydric alcohol containing 3 to 12 carbon atoms,
x, y and z represent numbers, and the sum of x, y and z represents a number sufficient to impart a molecular weight of about 400 to about 5,000 to the molecule and an aliphatic dicarboxylic acid containing 6 to 36 carbon atoms, wherein the molar ratio is about one mole diamine or derivative thereof per unreacted carboxyl group in the adduct.

3. The amine terminated amide of claim 2 wherein the triamine has an average molecular weight of about 400 and wherein A represents a trimethylol propane nucleus and the triamine contains about 5 to about 6 moles of propylene oxide per mole triamine.

4. The amide terminated amide of claim 2 wherein the triamine has an average molecular weight of about 3000 wherein A represents a glycerol nucleus and the triamine contains about 50 moles of propylene oxide per mole triamine.

5. The amine terminated amide of claim 2 wherein the triamine has an average molecular weight of about 5000 wherein A represents a glycerol nucleus and the triamine contains about 85 moles of propylene oxide per mole triamine.

6. The amide terminated amide of claim 1 wherein the polyoxyalkylene diamine is triethylene glycol diamine.

7. The amide terminated amide of claim 1 wherein the polyoxyalkylene diamine is tetraethylene glycol diamine.

8. The amide terminated amide of claim 2 wherein the polyoxyalkylene diamine is the N,N'-dialkyl derivative of triethylene glycol diamine, wherein the alkyl groups contain 1 to 4 carbon atoms.

9. The amine terminated amide of claim 2 wherein the polyoxyalkylene diamine is the N,N'-dialkyl derivative of tetraethylene glycol diamine, wherein the alkyl groups contain 1–4 carbon atoms.

10. The amine terminated amide of claim 8 wherein the alkyl groups are isopropyl.

11. The amine terminated amide of claim 9 wherein the alkyl groups are isopropyl.

12. An amine terminated amide comprising the reaction product of a polyoxypropylene triamine-aliphatic dicarboxylic acid adduct represented by the structure:

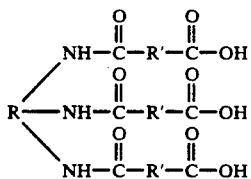

where R represents an oxyalkylated trihydric $C_3$–$C_{12}$ alcohol and R' contains 4 to 34 carbon atoms, said adduct resulting from the reaction of a polyoxypropylene triamine having a molecular weight of from about 400 to 5000 and about one mole per amine group in the triamine of an aliphatic dicarboxylic acid containing 6 to 36 carbon atoms, further reacted with about one mole per unreacted carboxyl group in said adduct of a compound from the group consisting of a polyoxyethylene diamine of the formula:

$$H_2N-CH_2-CH_2[-O-CH_2-CH_2]_x-NH_2$$

where x=2 or 3 or an N,N'-dialkyl derivative thereof wherein the alkyl groups contain from 1 to 4 carbon atoms.

13. A composition useful as an epoxy curing agent comprising the product of a polyoxypropylene triamine-aliphatic dicarboxylic acid adduct and one mole per unreacted carboxyl group of a polyoxyethylene diamine from the group consisting of triethylene glycol diamine and tetraethylene glycol diamine, wherein said adduct is the product of the reaction of a polyoxypropylene triamine having a molecular weight of from about 400 to 5000 and about one mole per amine group in the triamine of an aliphatic dicarboxylic acid containing 6 to 36 carbon atoms.

14. A composition useful as an epoxy curing agent comprising the product of a polyoxypropylene triamine-aliphatic dicarboxylic adduct and one mole per unreacted carboxyl group of a diisopropyl derivative of a polyoxyalkylene diamine from the group consisting of triethylene glycol diamine and tetraethylene glycol diamine, wherein said adduct is the product of the reaction of a polyoxy propylene triamine having a molecular weight of from about 400 to 5000 and about one mole per amine group in the triamine of an aliphatic dicarboxylic acid containing 6 to 36 carbon atoms.

* * * * *

UNITED STATES PATENT AND TRADEMARK OFFICE
CERTIFICATE OF CORRECTION

PATENT NO. : 5,097,070
DATED : March 17, 1992
INVENTOR(S) : Jiang-Jen Lin and George Phillip Speranza It is certified that error appears in the above-identified patent and that said Letters Patent is hereby corrected as shown below:

Column 8 line 56, delete "amide terminated" and insert therefor --amine terminated--.

Column 8 line 58, delete "amide terminated" and insert therefor --amine terminated--.

Column 8 line 61, delete "amide terminated" and insert therefor --amine terminated--.

Signed and Sealed this

Eighth Day of June, 1993

Attest:

MICHAEL K. KIRK

*Attesting Officer*           *Acting Commissioner of Patents and Trademarks*